United States Patent
Dahl et al.

(10) Patent No.: US 8,893,476 B2
(45) Date of Patent: Nov. 25, 2014

(54) SCR CLOSED LOOP CONTROL SYSTEM

(75) Inventors: Johan Dahl, Göteborg (SE); Moataz Ali, Göteborg (SE)

(73) Assignee: Volvo Lastvagnar AB, Göteborg (SE)

(*) Notice: Subject to any disclaimer, the term of this patent is extended or adjusted under 35 U.S.C. 154(b) by 468 days.

(21) Appl. No.: 13/139,303

(22) PCT Filed: Dec. 12, 2008

(86) PCT No.: PCT/SE2008/000697
§ 371 (c)(1),
(2), (4) Date: Aug. 10, 2011

(87) PCT Pub. No.: WO2010/068147
PCT Pub. Date: Jun. 17, 2010

(65) Prior Publication Data
US 2012/0137657 A1 Jun. 7, 2012

(51) Int. Cl.
- *F01N 3/00* (2006.01)
- *F01N 3/10* (2006.01)
- *F01N 3/20* (2006.01)
- *F01N 13/00* (2010.01)
- *F01N 3/035* (2006.01)

(52) U.S. Cl.
CPC .............. *F01N 3/208* (2013.01); *F01N 2610/02* (2013.01); *F01N 3/108* (2013.01); *F01N 2560/14* (2013.01); *F01N 2900/1622* (2013.01); *F01N 2560/026* (2013.01); *Y02T 10/24* (2013.01); *F01N 3/103* (2013.01); *F01N 3/035* (2013.01); *F01N 13/009* (2014.06)
USPC .................. 60/286; 60/274; 60/276; 60/277; 60/295; 60/301; 60/303

(58) Field of Classification Search
USPC ............ 60/274, 276, 277, 286, 295, 301, 303
See application file for complete search history.

(56) References Cited

U.S. PATENT DOCUMENTS 8,132,403 B2 * 3/2012 Toshioka et al. ................ 60/286
2002/0182127 A1 12/2002 Braun et al.
(Continued)

FOREIGN PATENT DOCUMENTS

JP    2008255899 A    10/2008
WO    WO9939809 A1    8/1999

OTHER PUBLICATIONS

International Search Report for corresponding International Application PCT/SE2008/000697, (Aug. 18, 2009).

(Continued)

*Primary Examiner* — Binh Q Tran
*Assistant Examiner* — Diem Tran
(74) *Attorney, Agent, or Firm* — WRB-IP LLP

(57) ABSTRACT

A method for an exhaust after treatment system of an engine including at least one selective catalyst reaction (SCR), at least one clean up catalyst downstream from the SCR, a urea injector upstream of the SCR and a first NOx sensor downstream the clean up catalyst. The method includes the steps of injecting a predetermined amount of urea by the injector, providing a second NOx sensor between the SCR and the clean up catalyst, measuring the NOx content received by the first NOx sensor, measuring the NOx content received by the second NOx sensor, comparing the first and the second NOx content with each other, and reducing the predetermined amount of urea if the first NOx sensor measures a higher NOx content than the second NOx sensor.

6 Claims, 1 Drawing Sheet

(56) References Cited

U.S. PATENT DOCUMENTS

2004/0055284 A1   3/2004   Ripper et al.
2007/0199309 A1   8/2007   Yano et al.

OTHER PUBLICATIONS

International Preliminary Report on Patentability for corresponding International Application PCT/SE2008/000697, (Nov. 22, 2010).

* cited by examiner

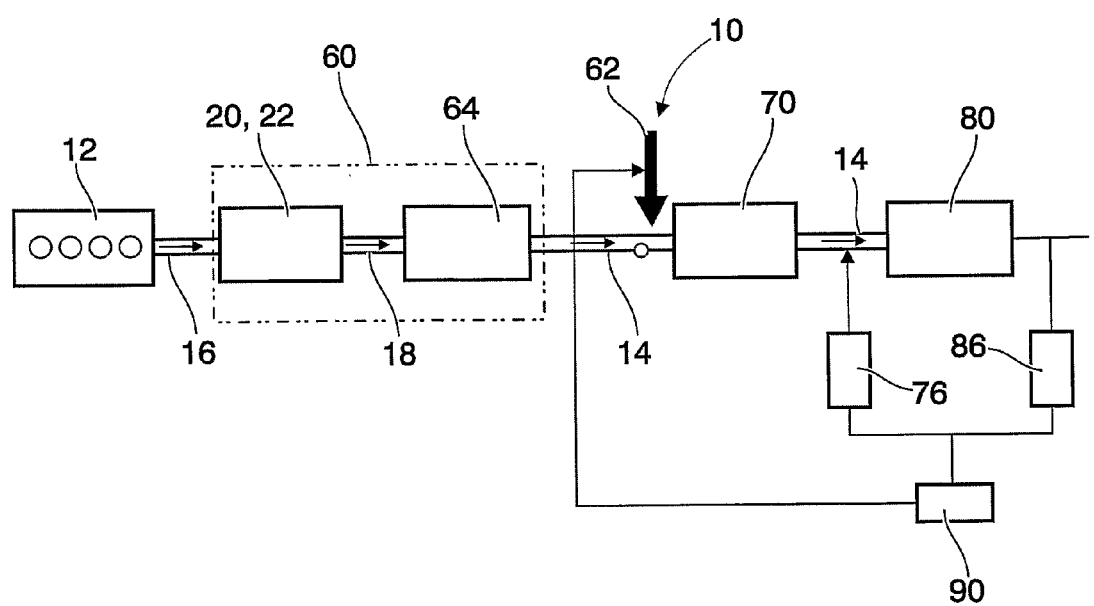

SCR CLOSED LOOP CONTROL SYSTEM

BACKGROUND AND SUMMARY

The invention relates to a control method for an exhaust aftertreatment system.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has an efficiency of up to about 52% and is thus the best converter of fossil energy. NOx emission concentration, i.e. the emission of nitrogen oxides NO and NO2, is dependent upon local oxygen atom concentration and the local temperature. Said high efficiency is however only possible at an elevated combustion temperature at which high NOx levels are inevitable.

Moreover, a suppression of NOx formation by internal means (air/fuel ratio) has the tendency to cause an increase in particulates, known as the NOx-particulates trade off. Furthermore, an excess of oxygen in the exhaust gas from a diesel engine prevents the use of stoichiometric 3-way-catalyst technology for reduction of NOx as is used in gasoline engine cars from the late 80-ties.

Both carbon particulates and NOx are typical emissions in the exhaust gas of diesel engines. Requirements for reducing such emissions increase and trigger various approaches in the art to reduce emissions. In the European patent EP 1 054 722 B1 an exhaust aftertreatment system is disclosed which combines a particulate filter collecting soot and nitrogen-oxides reduction catalysts in the exhaust tract. For removing soot NO2 is generated by oxidation of NO in an oxidation catalyst. Soot which is collected in a particulate filter is oxidized by NO2. Residual amounts of NO and NO2 in the exhaust gas are reduced to nitrogen gas in a selective-catalytic-reduction catalyst (SCR catalyst) by injecting ammonia into the SCR catalyst.

During operation all catalysts degrade due to accumulation of poisons, thermal migration of the catalyst material etc. This degradation seriously influences the operation of aftertreatment systems. Therefore it is desirable to detect the degradation of a catalyst in the aftertreatment system before the operation of the aftertreatment system fails or legal requirements cannot be fulfilled because of the degradation.

It is desirable to provide an improved exhaust aftertreatment system control method. It is also desirable to provide an adequate improved exhaust aftertreatment system.

In a first aspect of the present invention it is provided a method for an exhaust aftertreatment system (10) of an engine (12) comprising at least one selective catalyst reaction (SCR) at least one clean up catalyst downstream said SCR, an urea injector upstream said SCR and a first NOx sensor downstream said clean up catalyst, the method comprising the steps of injecting a predetermined amount of urea, by said injector, providing a second NOx sensor between said SCR and said clean up catalyst, measuring the NOx content received by said first NOx sensor, measuring the NOx content received by said second NOx sensor, comparing said first and said second NOx content with each other, reducing the predetermined amount of urea if said first NOx sensor is measuring a higher NOx content than said second NOx sensor.

An advantage with this embodiment of the present invention is that it gives to possibility to detect ammonia slip and control ammonia/urea injection directly, while at the same time maintaining low NOx.

Another advantage of the present invention is that it significantly reduces the need for continuous calibration of the SCR models. The accuracy of estimated stored NH3 increases when the ammonia slip after the SCR Is either estimated or measured.

Yet another advantage of the present invention is that it compensated for ageing and deterioration of system performance.

Still another advantage of the present invention is that it gives the possibility too detect system malfunctioning/poisoning.

In another example embodiment of the present invention it is further comprising a look up table having a reduced urea amount related to the difference in NOx measured by the first NOx sensor and the second NOx sensor.

An advantage of this embodiment is that the amount of urea can more quickly be adapted and adjusted to the current circumstances compared to a feed back loop which is the other possibility.

In still another example embodiment according to the present invention said urea amount is reduced in predetermined increments until the NOx measured by said first NOx sensor subtracted by the NOx measured by the second NOx sensor is smaller than a predetermined δNOx.

An advantage of this embodiment is that no prior measurements need to be done, the diagnostic method is self calibrating.

In another aspect of the present invention it is provided an exhaust after treatment system comprising at least one selective catalyst reaction (SCR) at least one clean up catalyst downstream said SCR, an urea injector upstream said SCR and a first NOx sensor downstream said clean up catalyst, characterized by a second NOx sensor provided between said SCR and said clean up catalyst.

In yet another example embodiment of the present invention it further comprising a control unit for comparing the detected NOx values from said first and second NOx sensors, wherein said control unit further comprising means for controlling the amount of urea injected by said urea injector where said amount of urea is dependent on the NOx values from said first and second NOx sensors.

BRIEF DESCRIPTION OF THE DRAWINGS

The present invention together with the above-mentioned and other objects and advantages may best be understood from the following detailed description of the embodiments, but not restricted to the embodiments, wherein is shown schematically:

FIG. 1 a first embodiment of an exhaust aftertreatment system according to the invention;

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

According to a first aspect of the invention a preferred exhaust gas after treatment system 10 depicted in FIG. 1 comprises a diesel particulate filter unit (DPFU) 60 arranged downstream of a diesel engine 12 and a NOx reducing unit 70 such as preferably a selective-catalytic-reduction (SCR) arrangement arranged downstream of said DPFU 60, wherein an injector 62 is provided for feeding reducing agent such as ammonia or urea into the exhaust gas and arranged downstream of said DPFU 60 and upstream said SCR catalyst. Downstream said SCR 70 is provided a clean up catalyst 80. The DPFU 60 comprises an oxidation catalyst stage (DOCS) 20, e.g. an oxidation catalyst (DOC) 22 and a diesel particulate filter (DPF) 64, which is arranged downstream of the DOC 22. Optionally, the DPF 64 can exhibit an oxidizing catalytic coating which can replace the DOC 22 as oxidation stage 20 or which can at least support the DOC 22.

The clean-up catalyst 80 is used to clean-up excess of ammonia by reaction (R1). Partial oxidation of ammonia, given by reactions (R2) and (R3), may produce nitrous oxide (N2O) or elemental nitrogen, respectively. Complete oxidation of ammonia, expressed by reaction (R4), generates nitric oxide (NO). The catalyst consists of or comprises a metal oxide and some noble metal and could be coated on a similar structure as the SCR catalyst or on even on the same structure.

$$4NH_3 + 3O_2 \rightarrow 2N_2 + 6H_2O \quad (R1)$$

$$2NH_3 + 2O_2 \rightarrow N_2O + 3H_2O \quad (R2)$$

$$4NH_3 + 3O_2 \rightarrow 2N_2 + 6H_2O \quad (R3)$$

$$4NH_3 + 5O_2 \rightarrow 4NO + 6H_2O \quad (R4)$$

A first NOx sensor 76 is provided between the SCR 70 and the clean up catalyst 80. A second NOx sensor 86 is provided downstream the clean up catalyst 80. The first NOx sensor 76 measures the NOx coming from the SCR 70. The second NOx sensor 86 measures the NOx coming from the SCR 70 and possibly the NOx created by the clean up catalyst 80. A control unit 90 compares the NOx values from the first NOx sensor 76 with the NOx values from the second NOx sensor 86. If the second NOx sensor 86 has detected a higher NOx content in the exhaust gases than the first NOx sensor 76 it is an indication that the clean up catalyst has transformed urea slip in the exhaust gases into NOx detected by said second NOx sensor 86. If this second NOx sensor 86 is in fact detecting a higher NOx value than the first NOx sensor 76, a signal is sent the urea injector 62 to decrease the urea injection by a predetermined amount. The feed back signal from the control unit to the urea injector may ensure that the correct amount of urea is injected to the SCR regardless of its storage capacity, operating conditions, deterioration of system performance and/or its age and at the same time keep the NOx levels at a low level. This feed back loop may significantly reduce the need for continuous calibration of the SCR system since it is selfcalibrated by said feed back signal from the control unit to the urea injector. The inventive method may also be used as a detection method of a malfunctioning and/or poisoned SCR. If abnormal amount of NOx is created by the clan up catalyst then one may suspect that the SCR system is not performing as it should.

The amount of urea may be adjusted by sending a steering signal from the control unit 90 to the urea injector 62 which may decrease the opening time of the urea injector, decrease the frequency of a pulsated injection or a combination of said methods or any other well known method of adjusting the amount of an injector.

A look up table may be used in order to determine the degree of reduced urea amount related to the difference in NOx measured by the first NOx sensor and the second NOx sensor. This table may comprise predetermined amounts of reduced urea injections corresponding to detected differences by said NOx sensors, i.e., a detected $\delta NOx$ may correspond to a predetermined decreased amount of urea injection.

The use of a first and a second NOx sensor after the SCR may result in increased robustness of tail pipe NOx control and assist in OBD (On Board Diagnosis) functions. The first and second NOx sensor may also significantly increase the accuracy of the estimation of NH3 storage in the SCR. Hence, the need for continuous calibration of the SCR buffer models may be reduced. The first and second NOx sensors also have the ability to detect ammonia slip. Hence, a more accurate and self adjusted urea injection for aged and reduced performance SCR catalyst may be accomplished while at the same time maintaining low NOx.

Said urea amount may also be reduced in predetermined increments until the NOx measured by said second NOx sensor 86 subtracted by the NOx measured by the first NOx sensor 76 is smaller than a predetermined $\delta NOx$. The predetermined increments may be equal increments or larger in the beginning of the reduction, than in the end of said reduction.

The DOCS 20, i.e. the DOC 22 and/or the catalytic coating of the DPF 64, is preferably used to generate a sufficient amount of NO2 for passive oxidation of soot trapped in the DPF 64 according to the reaction $$NO + NO_2 \rightarrow NO_2. \quad (R5)$$

The main function of the DPF 64 is to trap particulate matter such as soot and ashes contained in the exhaust gas. A typical vehicular exhaust aftertreatment system 10 requires one to several 100 000 km driving to fill the DPF 64 with ashes, and the DPF 64 can be emptied from ash by demounting the DPF 64 at service. To fill the DPF 64 with soot requires only one to several 1000 km driving. However, the soot can be oxidized to CO2 which can be done during operation of the vehicle.

For some applications it may be beneficial to coat the DPF 64 with a catalytically active material including the properties of an oxidation catalyst into the DPF 64. For proper function of the DPF 64 it is recommended to control the amount of soot trapped in the DPF 64. Regeneration of the DPF 64 may be accomplished in various ways known in the art. Preferably, NO2 can be used for passive oxidation of the trapped soot according to the reaction is $$2NO_2 + C \rightarrow 2NO + CO_2. \quad (R6)$$

For an efficient passive regeneration it is necessary to establish the exhaust gas temperature above a critical limit, preferably above 250° C., and to provide an adequate amount of NO2. The amount of NO2 in the exhaust gas fed into the DPF 64 can be increased by the DOCS 20 by oxidation of NO to NO2.

Depending in the engine 12 emissions of soot and nitrogen oxides NO, NO2, generally referred to as NOx, the passive oxidation of soot can keep the soot level in the DPF 64 low at exhaust temperatures above 250° C. For some engine emissions the ratio of NOx/soot is too low for oxidizing the soot by NO2. Alternative to passive oxidation of soot it can be oxidized by oxygen at high temperatures, preferably at about 600° C. This can be achieved by either providing a burner (not shown) in the exhaust aftertreatment system 10 or by adding fuel to the exhaust gas which is burnt on an oxidation catalyst (riot shown) upstream of the DPF 64. Activation of the burner or adding fuel is done in a regeneration phase which has a typical duration of a few minutes and which can last as long as 30 min if necessary.

Downstream of the DPF 64 and upstream of the nitrogen-oxides reduction unit 70, by way of example an SCR catalyst, the exhaust gas contains one or more constituents as NO and NO2, which can be deoxidized in the SCR catalyst.

The main task of the SCR catalyst is to reduce NOx, i.e. NO and NO2, with a reductant to nitrogen gas N2 and water H2O. On the SCR catalyst ammonia NH3 reacts with NOx to form nitrogen. Usually on vehicles urea is injected into the exhaust gas and by the exhaust gas temperature urea is thermolyzed or hydrolyzed into NH3 in the exhaust gas and the SCR catalyst. The reductant, e.g. NH3 or urea, is added to the exhaust gas upstream of the SCR catalyst, for instance by the injector 62 (indicated by a broad arrow upstream of the SCR catalyst). The efficiency of the SCR catalyst is strongly dependent on the exhaust gas temperature, the space velocity of the exhaust gas and the NO2/NO ratio in the exhaust gas which enters the SCR catalyst.

Depending on the kind of NOx there are three principal chemical reactions possible:

$$4NO+4NH_3+O_2 \rightarrow 4N_2+6H_2O \quad (R7)$$

$$NO+NO_2+2NH_3 \rightarrow 2N_2+3H_2O \quad (R8)$$

$$6NO_2+8NH_3 \rightarrow 7N_2+12H_2O \quad (R9)$$

The reaction (R7) has the highest efficiency and is efficient from exhaust temperatures below 200° C. and above. Reaction (a) becomes efficient at 300° C. and for reaction (c) the efficiency is lower than reaction (a) on vanadium based SCR-catalyst while it is on zeolite-based catalyst more efficient than reaction (a) but not as efficient as reaction (b). Further, on zeolite-based catalyst an unfavourable competitive reaction to reaction (c) exist which is generating the greenhouse gas N2O:

$$4NO_2+4NH_3 \rightarrow 2N_2O+2N_2+6H_2O. \quad (R10)$$

The NO2 formation in the DOCS 20 will depend on the exhaust gas mass flow and the temperature of the DOCS 20. Besides the flow and temperature dependency, the DOC 22 and/or the catalytic coating in the DPF 64 adsorbs sulphur (S), which can be contained in the exhaust gas, at lower temperatures and releases the sulphur at temperatures above 350° C. If driving conditions let the DOCS 20 adsorb a lot of sulphur, the NO2 formation will be poisoned. The NO2 content after the DPF 64 will also depend on the condition of the DPF 64.

Sulphur is the main source to deactivate NO2 formation on the DOC 22 and on the catalytic coating of the DPF 64. Sulphur sticks to the catalyst at lower temperatures, typically below 400° C. and is released at higher temperatures (>400° C.). The actual temperatures for sulphur adsorption and desorption depend on the particular catalyst formulation.

When low sulphur diesel fuel is used, which is now generally available in Europe and USA, it will take several hours or a day of engine operation without reaching 400° C. to give a noticeable decrease in NO2 formation in the DOC 20 and/or the coated DPF 64. Such driving is unusual with heavy duty vehicles but can occur. However, sulphur poisoning of the DOC 22 and/or the coated DPF 64 can occur after shorter times if the driver gets fuel with higher sulphur contents, e.g. when driving in markets without low-sulphur fuel or fuelling high sulphur fuel by mistake. It's then important to detect such a poisoning and make a desulphation of the DOCS 22. Sulphur is removed from the DOC 22 and/or the coated DPF 64 by heating the catalysts to above 400° C. for more than 5 minutes, which can be done by injecting fuel into the exhaust or by activating a burner. Another source of sulphur is the lubricant oil.

Some conditions on some catalytic materials can cause a reversible degradation of the DOCS 20 in a manner that can it be reconditioned when heated to high temperatures above e.g. 500° C. for a predetermined time period, e.g. several minutes.

The desulphatisation temperature does not degrade the SCR-catalyst and during desulphatisation the SCR-catalyst gets a temperature where it works very efficient and the influence of NO2/NO ratio is low.

The description of the virtual sensor is a map or physical model of the NO2 formation in the DOC 22 and optionally in the DPF 64 if it's coated and on the NO2 consumption in the DPF 64. The sulphur dependency of the NO2 will not be included in the model since this invention is a way of handling the sulphur effect on NO2 (and it's hard to model also due to unknown variations of sulphur content in the fuel (low-sulphur fuel could be any thing below 10 ppm in Europe for example).

NOx conversion may be used for on-board-diagnosis of the correct function of the DOCS 20, i.e. the DOC 22 and/or the oxidizing catalytic coating of the DPF 64, if the DPF 64 is provided with such a coating. The NOx conversion is derived from temperature, exhaust gas mass flow and NO2 levels in the exhaust gas. The NOx sensor can be a real, physical sensor or a virtual sensor wherein the NOx level is calculated based on an appropriate model described below.

A virtual NOx sensor is a rather complex model and consists preferably of or comprises following sub-models which are given in quotes:

"Engine-out NOx": The amount of NOx at the outlet of the engine 12 can be estimated by a sensor or a model with following inputs for example: load or fuel amount, timing for fuel injection, engine speed, intake air pressure, intake air temperature, EGR (EGR=exhaust gas recycling) amount and intake air humidity. These are parameters of the engine 12 and sensed values. There are several ways to build the model. It can be map-based where all or at least some of the relevant parameters are, or can be, corrected by correction factors laid down in the map. It can also be a model built on a neural network as base.

"Exhaust gas flow": The exhaust gas flow can be measured, or derived from the measured air intake flow and the fuel amount, or from the calculated air intake flow from engine speed, intake air pressure, intake air temperature, EGR amount and volumetric efficiency of the engine.

"Exhaust gas flow in oxidation catalyst": The exhaust gas flow in the DOCS 20 can be measured or calculated.

"Temperature in catalyst": The temperature can e.g. be measured upstream of the DOCS 20. By applying an appropriate signal filter the measured value together with the exhaust gas flow into the DOCS 20 as a parameter can represent the actual catalyst temperature. Alternatively the temperature can be calculated by using a simple heat balance.

"Sulphur in oxidation catalyst": The sulphur content in the DOCS 20 is preferably calculated. For instance the calculation can be derived from the parameters in parentheses: (sulphur content in catalyst)=(sulphur content in catalyst a second before)+(sulphur adsorbed from exhaust during a second)−(sulphur desorbed during a second). The parameter "sulphur adsorbed from exhaust during a second" is the sulphur content in the fuel and lubrication oil consumed during the said second multiplied with a factor, wherein the factor is between 0 and 1 and has a temperature dependency which can e.g. be derived from a map containing temperature dependent values of the factor. The parameter "sulphur desorbed during a second" is the sulphur content in the DOCS 20 one second before multiplied with another temperature dependent factor which can be derived in the same way as the first factor described above.

"NO2 formation in catalyst": The NO2 formation in the DOCS 20 can be derived from interpolating in a 3-D based on the parameters exhaust gas flow, temperature in catalyst and sulphur content. It can also be calculated using a physical model with sulphur content, temperature, exhaust gas flow and oxygen concentration as input parameters. The model can be e.g. a specific NO2 formation rate which is k1.CNO.C02 and an NO2 decomposition rate which is k2.CNO2, where k1 and k2 are temperature dependent and sulphur-content dependent parameters and C is the concentration of NO, NO2 and O2, respectively. The specific rate is integrated over the catalyst volume. If there is a wide range of the HC content in the engine's working area or if an HC-injector is used, then the HC level is also an input parameter to the model, e.g. as a denominator for the specific rates (1+Ka.CHc)-

"NO2 out from the particulate filter": The amount NO2 which is released from the DPF 64 is the difference between the amount of NO2 fed into the DPF 64, NO2 formed in the DPF 64 (which is zero if no catalytic layer is provided in the DPF 64 for NO2 generation) and NO2 consumed by soot in the DPF 64. NO2 formed in the DPF 64 can be calculated in the same manner as the NO2 formed in the DOCS 20 (see above), preferably a physical model. NO2 consumed by soot in the DPF 64 is proportional to the amount of soot in the DPF 64 and can be expressed as a specific rate k3.CNO2.Csoot. Again, k3 is a temperature dependent parameter and C the respective concentration of NO2 and soot.

"Soot load in particulate filter": The soot load in DPF 64 can be derived from a measured pressure drop over the DPF 64 and/or by applying a model: (soot in the DPF 64 at a current time)=(soot in the DPF 64 at a time before the current time)+(soot emitted by the engine during the current time)−(soot burnt by NO2 during the current time). Soot burnt by NO2 during the current time is given by the "NO2 out from particulate filter" model, soot emitted by the engine during the current time is given from a soot sensor or a similar model as the "Engine-out NOx" model. The usage of a pressure drop for calculation of a soot amount in the DPF 64 can introduce some errors due to the fact that the soot characteristic is changing with time. Therefore it is preferred to use a model for calculating the soot load and use the pressure drop as a qualitative check of the model.

From estimating NO2 and NOx contents in the exhaust gas at different locations an actual measured and estimated conversion of NO2 in the DPFU 60 and conversion NOx in the SCR catalyst can be derived. At high loads it is preferred to measure the NO2 content in the exhaust gas upstream of the nitrogen-oxides reduction unit 70 and to calculate, i.e. estimate an expected NO2 content upstream of the nitrogen-oxides reduction unit 70. Additionally, the NOx content upstream of the nitrogen-oxides reduction unit 70 can be measured or calculated. Downstream of the nitrogen-oxides reduction unit 70 the NOx content is measured and calculated. A difference between the measured and the calculated contents indicates that a problem with the NO oxidation in the DPFU 60 has occurred.

At low loads it is preferred to calculate the NO2 content in the exhaust gas yielding an estimated NO2 content upstream of the nitrogen-oxides reduction unit 70 and to calculate and/or to measure an expected NOx content upstream of the nitrogen-oxides reduction unit 70. Downstream of the nitrogen-oxides reduction unit 70 the NOx content is measured and calculated.

One or more temperatures sensors (not shown) are provided at convenient locations for determining the catalysts temperatures.

The NOx-conversion is determined based on these values and on the temperature, exhaust gas massflow and the estimated NO2 content.

The invention claimed is:

1. A method for an exhaust aftertreatment system of an engine comprising at least one selective catalyst reaction (SCR) at least one clean up catalyst downstream from the SCR, an urea injector upstream of the SCR and a first NOx sensor downstream from the clean up catalyst, the method comprising the steps of
   (a) injecting a predetermined amount of urea by the injector,
   (b) providing a second NOx sensor between the SCR and the clean up catalyst
   (c) measuring the NOx content received by the first NOx sensor,
   (d) measuring the NOx content received by the second NOx sensor,
   (e) comparing the first and the second NOx content with each other, and
   (f) reducing the predetermined amount of urea if the first NOx sensor measures a higher NOx content than the second NOx sensor.

2. The method according to claim 1, further comprising a look up table having a reduced urea amount related to the difference in NOx measured by the first NOx sensor and the second NOx sensor.

3. The method according to claim 1, wherein the urea amount is reduced in predetermined increments until the NOx measured by the first NOx sensor subtracted by the NOx measured by the second NOx sensor is smaller than a predetermined NOx.

4. A use of the method according to claim 1 for compensating for at least one of aging and deterioration of exhaust after treatment system performance.

5. A use of the method according to claim for detecting at least one of SCR malfunctioning and poisoning.

6. A use of the method according to claim 1 for estimating the ammonia storage capacity in the SCR.

* * * * *